Nov. 21, 1939.  W. F. DEHUFF  2,181,078
MIXING MACHINE BEATER
Filed May 26, 1937
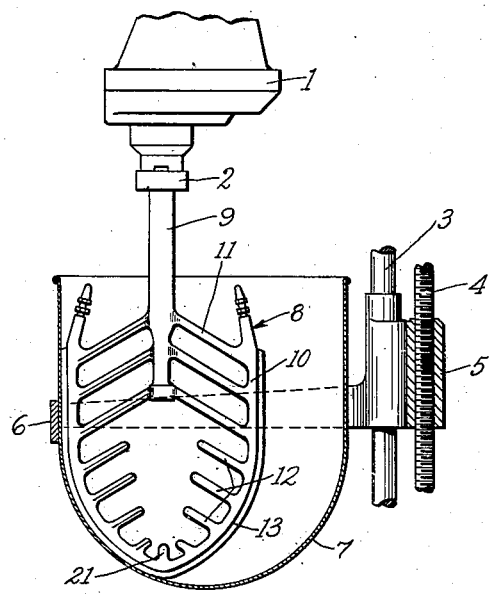
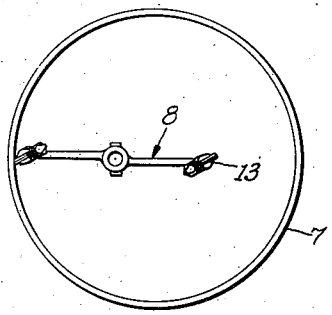
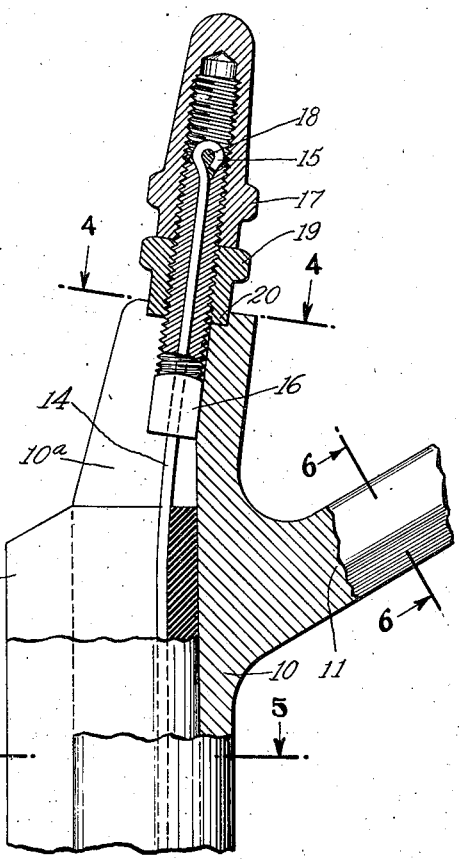
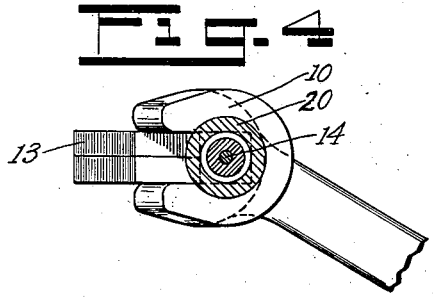
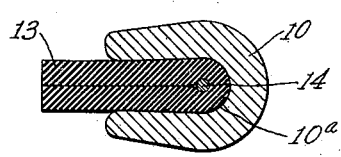
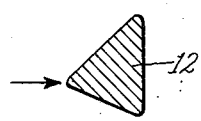
INVENTOR.
WALTER F. DEHUFF
BY *Georges Hastings*
ATTORNEY.

Patented Nov. 21, 1939

2,181,078

UNITED STATES PATENT OFFICE

2,181,078

MIXING MACHINE BEATER

Walter F. Dehuff, Glen Rock, Pa., assignor to American Machine & Foundry Company, a corporation of New Jersey Application May 26, 1937, Serial No. 144,796

5 Claims. (Cl. 259—102)

This invention relates to mixing machines, and more particularly to improvements in beaters used on such machines for incorporating ingredients of batches placed therein.

It is difficult to manufacture beaters or mixing blades which will touch all parts of the sides and bottom of mixing bowls due to the irregularities in the fabrication of this type of metal container, and as a result thereof when batches of relatively clinging consistency are mixed there is a tendency for some of the materials to adhere to the bowl sides and bottom and not be thoroughly incorporated. Heretofore, in order to avoid the above mentioned condition, it has usually been customary to stop the rotation of the beater and allow the operator tending the machine to scrape parts of the container to which portions of the mix adhered in order to direct them back into the batch. On occasion it has been necessary to stop a machine several times during mixing in order to prevent such accumulations of material on the bowl. It is, therefore, the chief object of this invention to provide a beater which will effectively mix together the ingredients of a batch in a mixing bowl, and which at the same time will have an automatic, and positive scraping coaction with the bowl. That is, the provision of means for systematically removing that portion of the mix which clings to the bowl and redirecting it back into the batch. It is a further object to provide a beater having a bowl contacting edge provided with a yielding or flexible member which will allow a closer contact with the sides of a bowl containing the mix than has heretofore been obtainable.

It is an added object of the invention to provide a beater, the outer member of which is provided with a groove in which is seated and firmly held a rubber strip, which due to its flexibility and elasticity furnishes an automatic means for removing from the sides of the bowl that part of the mix which tends to cling so that it is again directed into the active mass and thoroughly incorporated. It is a further object to provide a beater having a rubber insert along its active bowl engaging face and novel means for securing said strip in operative position. It is an additional feature of the invention to provide a beater having vanes formed with a generally triangular cross section so that in the operation of the beater the vanes will direct the material away from the space behind the vanes, thereby eliminating the building up of material behind the vanes.

A further object is to provide a beater having one or more sets of freely projecting vanes extending inwardly from the lower portion of its edge, thereby constituting an open center beneath the supporting post in order to produce a greater transfer of material at the bottom of the beater across the center. This arrangement avoids collection of material around the post, which is particularly troublesome when mixing certain types of materials, such as abrasives.

It is an added object to provide a novel beater device having a replaceable rubber scraping blade which can be removed and replaced whenever necessary. The invention also includes the provision of means located at the bottom center of the beater for preventing building up mix material at that point.

With these and other objects not specifically mentioned in view, the invention consists in certain combinations and constructions which will be hereinafter fully described, and then specifically set forth in the claims hereunto appended.

In the accompanying drawing, which forms a part of this specification, and in which like characters of reference indicate the same or like parts:

Fig. 1 is a side elevation partly in section showing an improved beater in operative position in a mixing bowl;

Fig. 2 is a plan view of the beater in a bowl showing the close operative contact between the bowl and a beater edge;

Fig. 3 is a detail view partly in section showing one means of securing the yieldable scraping member to the beater;

Fig. 4 is a sectional view taken on line 4—4 of Fig. 3;

Fig. 5 is a sectional view of the outer beater member taken on line 5—5 of Fig. 3; and Fig. 6 is a sectional view taken on line 6—6 of Fig. 3.

Referring to the drawing, Fig. 1 shows a casing 1 of a conventional type similar to that shown in my Reissue Patent 18,096, granted June 9, 1931, which casing is provided with a coupling 2 for securing a beater in operative position. Mounted upon guide rods 3 is a bowl supporting bracket 5 which is moved vertically thereon by means of threaded rods 4. Bracket 5 is provided with a bowl supporting cradle 6 by means of which a mixing bowl 7 is raised and lowered to and from mixing position. One form of beater, indicated generally at 8 has a shank 9 removably secured in coupling 2. This beater which is of substantially heart shaped configuration, is provided with an outer member 10 having one or more vanes 11 extending from the upper portions thereof to the shank 9 and formed integral therewith. As shown in Fig. 1, along the lower portion of the outer member of the beater, and extending inwardly along the inside edge thereof beneath the shank 9 and the cross vanes 11 are a plurality of relatively short freely projecting vanes 12, which vanes in the present embodiment are generally triangular in cross section as shown in Fig. 6. The vanes on the right side of the beater are faced in a direction opposite to those on the left side in order to maintain the same relation between the mix and the surfaces of the vanes on both sides of the beater. The action of the vanes is such that as they pass through the material, the forward faces thereof have an inclined relation to the direction of their movement, as shown by the arrow in Fig. 6, so that the material is directed away from the space behind the vanes. This arrangement tends to produce a void behind the vanes and thus prevent building up of the material behind or upon the vanes.

The scraper blade can be attached to the beater in several ways. One method which has proved very satisfactory is shown in Figs. 1 to 5 inclusive, in which the outer member 10 is furnished with a groove extending substantially along its entire length in order to provide for the reception of a flexible, or yieldable or elastic material, such as rubber, which will afford and provide a close contact of the beater edge with the bowl sides and bottom, regardless of any irregularities in the bowl and insure a systematic scraping of the bowl sides by the beater during its rotation in a mix contained within the bowl. As shown in Fig. 5, the scraper blade consists of one or more strips of rubber folded upon itself, inserted in the groove and held in position therein by means of tension device 14. This blade construction allows the beater to wipe against the mixing container 7 each time it approaches and leaves the sides thereof. Due to the nature of the material used, this action has no detrimental effect upon the container or mix. While any suitable material can be used for mounting the scraper blade on the beater, it has been found that tinned piano wire is exceptionally satisfactory, due to its strength and durability. One means of securing the scraping blade 13 against displacement and in active position on the beater is shown in Fig. 3. The strip 13 and its securing wire are placed in the groove 10a, with the strip folded over the wire upon itself with its edges abutting to form a scraper blade, and ends of the wire inserted through tension screws 16 and firmly fastened therein. The wire can be secured in the screw 16 as shown in Fig. 3, in which a loop is formed in the ends of the wire and allowed to fit into a countersunk portion on the screw end while a pin 18 is inserted through the loop to more surely hold the wire in the screw. A lock nut 19 is threaded upon the screw and cooperates to hold the tension screw in proper position. It is obvious, however, that other methods of fastening the loose wire ends may be resorted to, such for instance as riveting and/or soldering them in the screw. A casing nut 17 is threaded over said screw and bears against lock nut 19. In order to prevent any possible lateral movement of the assembly of screw 16 and nuts 17 and 19, a countersunk portion 20 is formed in the ends of member 10 for receiving a reduced portion on nut 19.

A button 21 in some instances is formed on the outer member 10 at the bottom center of the beater to prevent the collection of material on the beater at this point. If it be found that there is a tendency for material to cling to the side member between the vanes similar button like formations may be located between the vanes.

In the beater shown in the drawings, the outer member 10 lies in a plane formed at an angle to the arms 11. Since faces on opposite sides of shank 9 extend in opposite directions, see Figs. 2 and 4, it is necessary to form a connecting groove having the form of a reverse curve to connect the grooves on the two parts of member 10 in order that the strip or strips of rubber or other scraping material can be secured firmly therein. It is obvious, however, that the grooved outer member and the beater arms may lie in the same plane and equally satisfactory results will be obtained.

The several means referred to may be varied in construction within the scope of the claims, for the particular device selected to illustrate the invention is but one of the many possible concreate forms of the same. The invention is not, therefore, to be restricted to the precise details of the structure shown and described.

What is claimed is:

1. In a beater, the combination with a driving shank providing means for rotating it in a mixing bowl, of a beater head including a beater blade with a rigid upright outer member shaped to conform to the general inside contour of a bowl, arms joining said member to said shank, a flexible strip of rubbery material detachably affixed along the outer edge of said member and arranged to engage and scrape the sides of a bowl during the rotation of said beater therein.

2. A beater comprising a shank for rotating said beater in a mix in a bowl, a head formed on said shank, a grooved outer member forming part of said head, a folded rubber strip set in said groove with its folded edge inward, a wire disposed in said fold, and means at the end of said wire beyond the ends of the strip to tension the wire and thereby place the fold of the strip under compression with the long edges of the strip presented outwardly to serve as a scraper.

3. A beater comprising a shank for rotating said beater in a mix in a bowl, a head formed on said shank in a substantially upright plane, an outer member conforming generally to the curvature of the bowl, forming a part of said head, said member on opposite sides of said shank facing in opposite directions and at symmetrical trailing angles with respect to the plane of said head, a rubber strip carried by said member for scraping said bowl during the rotation of said beater, and means for securing said strip to said member.

4. A beater comprising a shank for rotating said beater in a mix in a bowl, a head formed on said shank, a grooved outer member forming a part of said head, a rubber strip located in said groove to scrape said bowl during rotation of said beater, and means for securing said strip in operative poistion in said groove, said means including a tension element, a tension screw attached to the ends of said element, and locking means holding said tension screw in location in said member.

5. In a mixer of the class described: a bowl having a concavely curved bottom; a beater comprising a rotatable shank and a rigid open work beater head secured to said shank for rotation within said bowl, and having an outer member with a curved portion conforming generally to the curvature of said bowl, and an elongated scraper element of flexible, rubbery material secured to said member only and extending along the curved portion thereof and having a yieldingly resistant flexible edge adapted to explore intimately said curved surface of the bowl during rotation of said beater, and means clamping rigidly to said outer member a non-scraping portion of said scraper element.

WALTER F. DEHUFF.